Nov. 26, 1957

O. C. GRUENDER 2,814,450

LUBRICATION MEANS FOR GYRATORY CRUSHERS
AND FEED MECHANISM THEREFOR

Filed Oct. 29, 1953

Inventor
Oscar C. Gruender
by Parker & Carter
Attorneys

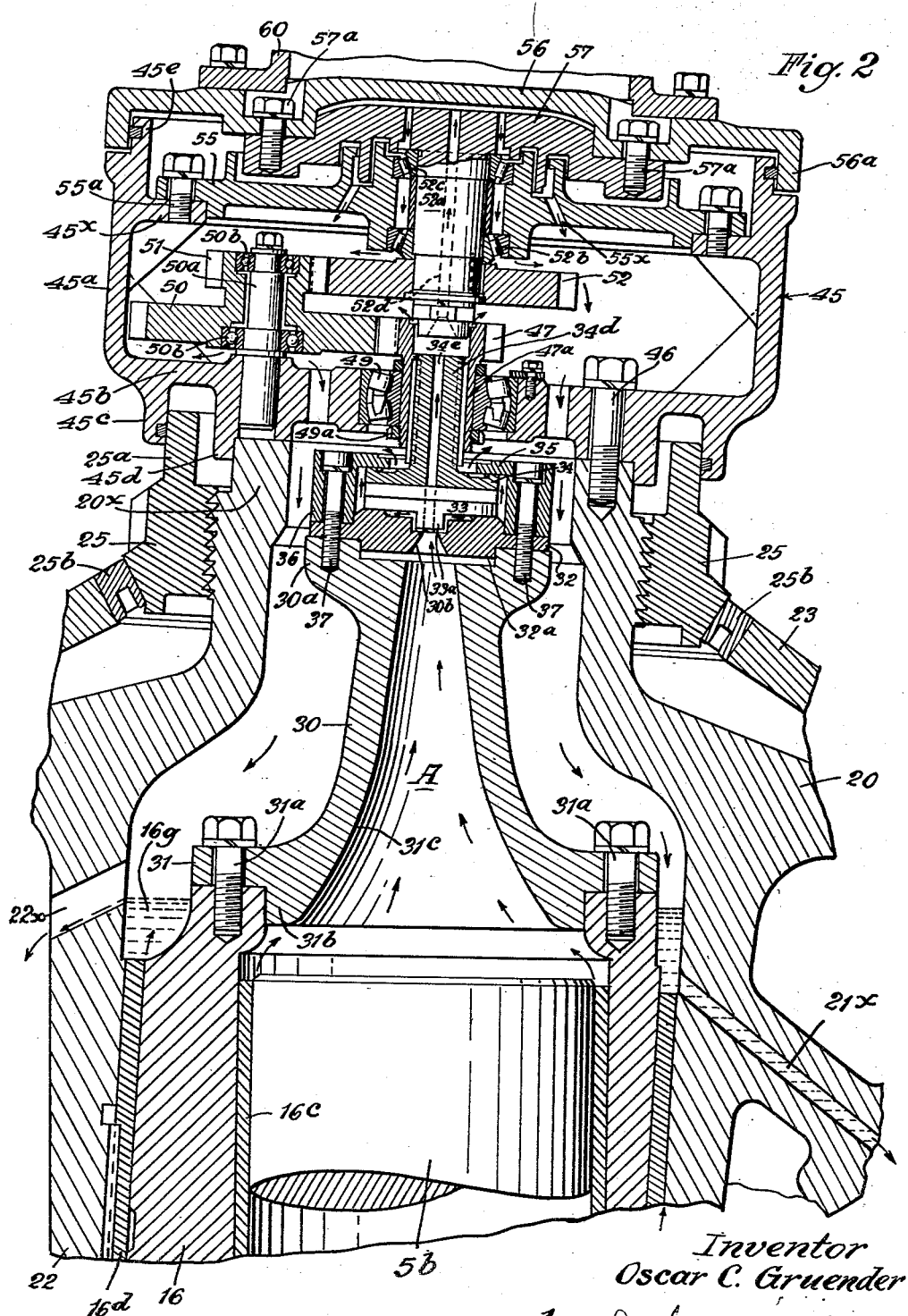

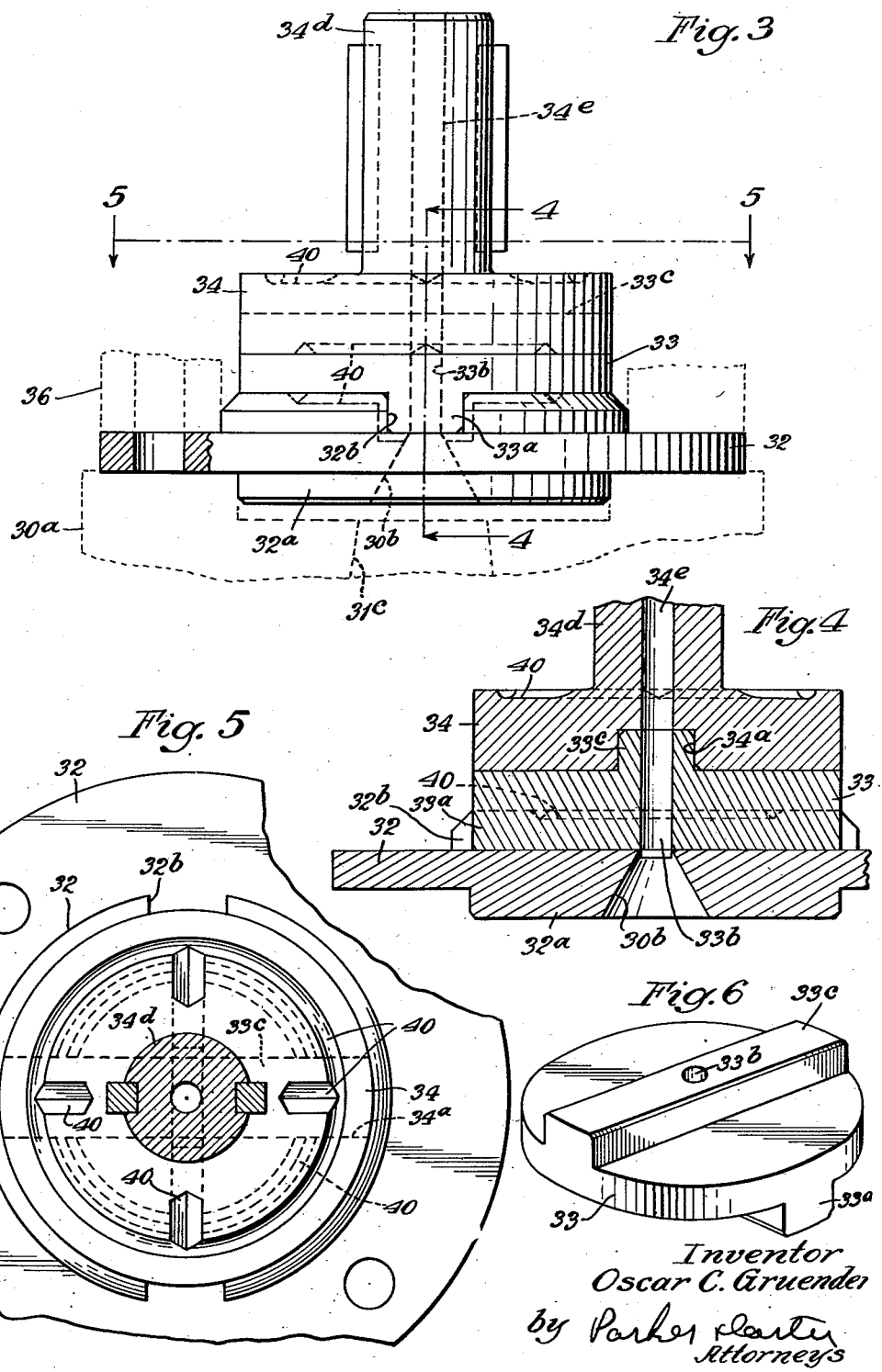

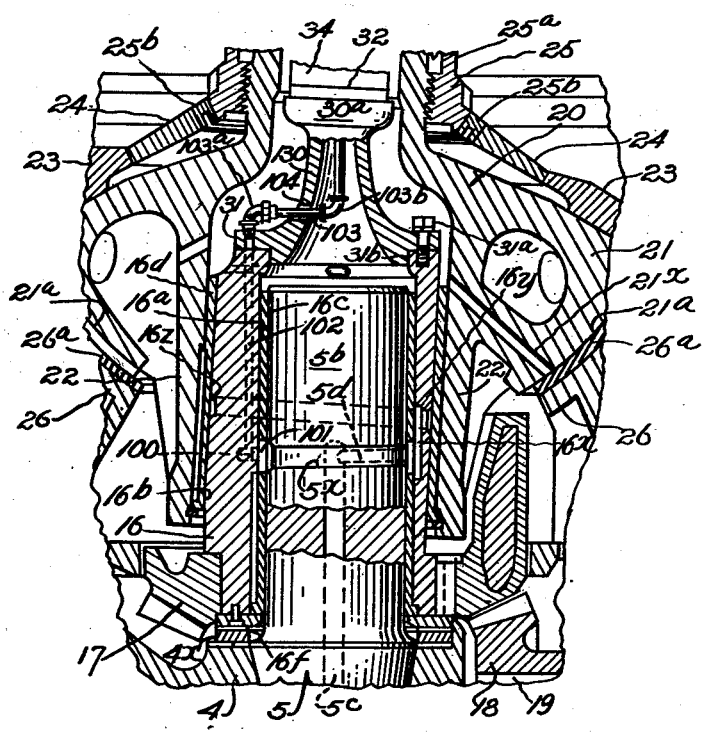

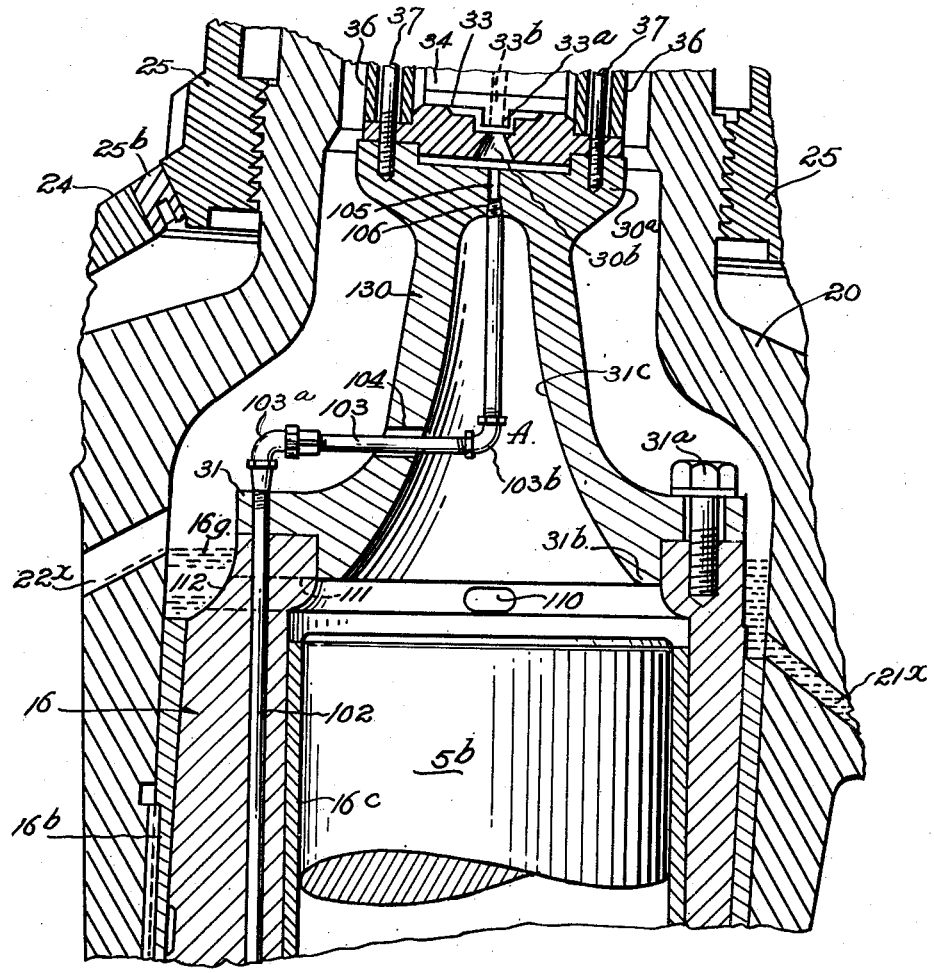

2,814,450

LUBRICATION MEANS FOR GYRATORY CRUSHERS AND FEED MECHANISM THEREFOR

Oscar C. Gruender, Milwaukee, Wis., assignor to Nordberg Manufacturing Company, Milwaukee, Wis., a corporation of Wisconsin Application October 29, 1953, Serial No. 389,093

10 Claims. (Cl. 241—202)

My invention relates to an improvement in crushing or grinding machines and has for one purpose to provide an improved oiling system for crushers or grinders of the type in which a head is gyrated toward and against a normally fixed overhanging bowl.

Another purpose is to provide improved means for oiling a feed delivery device for such a crusher or grinder.

Another purpose is to provide an improved actuating connection for a feed member mounted on and usable with the gyrated head of a crusher or grinder.

Other purposes will appear from time to time in the course of the specification and claims.

I illustrate the invention more or less diagrammatically in the accompanying drawings, wherein:

Figure 2 is a similar view on an enlarged scale illustrating in axial section the upper part of the structure of Figure 1;

Figure 3 is a side elevation, with parts in section, of the driving connection for the feed member;

Figure 4 is a section on the line 4—4 of Figure 3;

Figure 5 is a section on the line 5—5 of Figure 3;

Figure 6 is a detail;

Figure 7 is a vertical axial section with parts in side elevation illustrating a variant form; and Figure 8 is a similar view on an enlarged scale illustrating in axial section the upper part of the structure of Figure 7.

Figure 1:
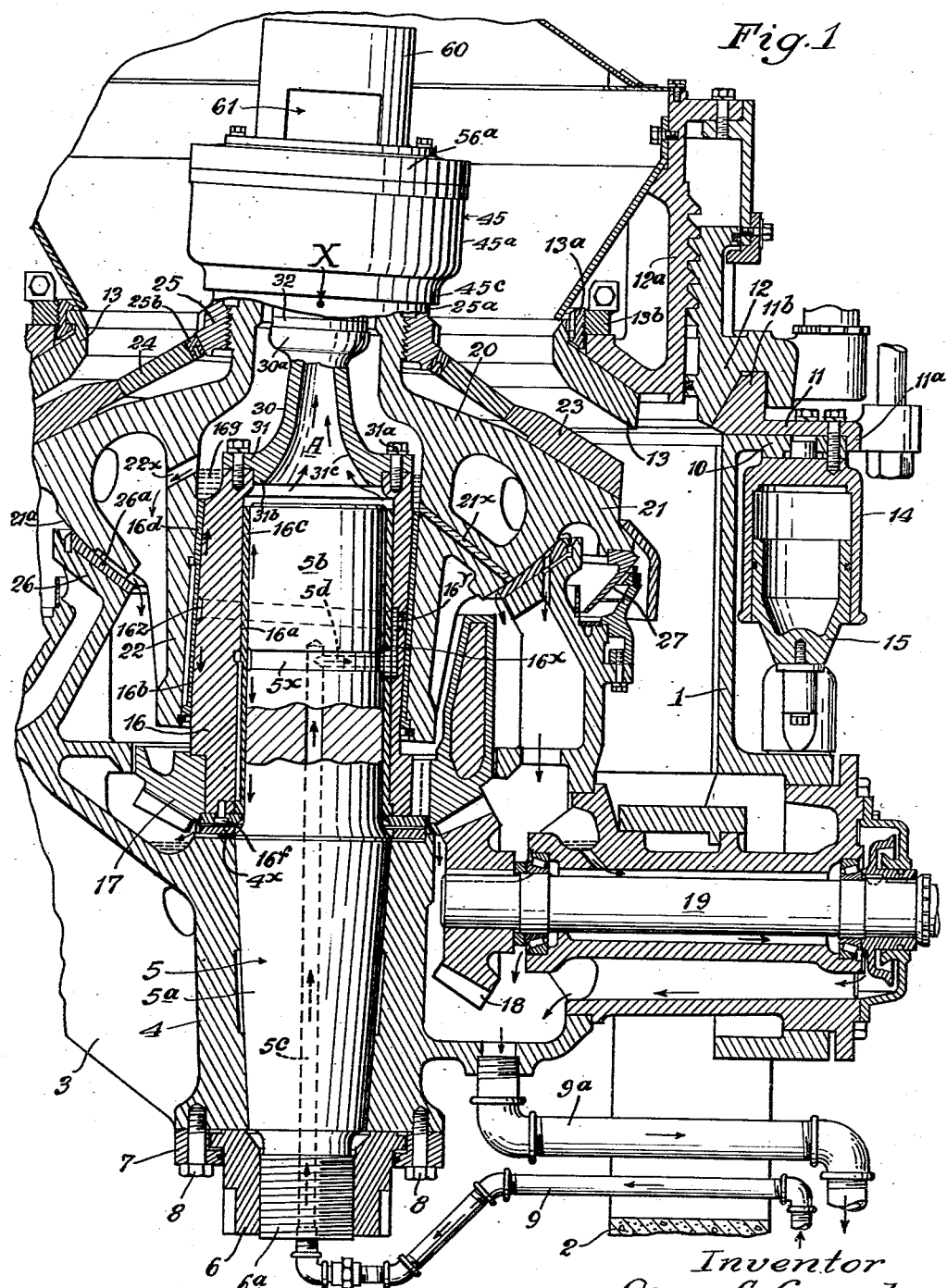
Figure 1 is a vertical axial section with parts in side elevation.

The present application is a continuation in part of my application Serial Number 305,211, filed August 19, 1952, now abandoned, for Lubrication Means for Gyratory Crushers and Feed Mechanism Therefor.

Referring to the drawings, 1 generally indicates any suitable circumferential frame member which may rest on any suitable foundation fragmentarily illustrated at 2 in Figure 1. It will be understood that the frame member 1 extends circumferentially about the machine and that it suitably supports, through spiders 3, a fixed central hub 4. 5 is a normally fixed central shaft having a tapered lower portion 5a received in the hub 4 and a generally cylindrical portion 5b extending upwardly therefrom. The shaft may be held in position, for example by any suitable locking or positioning nut 6 and the screw-threaded stub end 6a of the shaft 5. The nut 6 may be removably held in position by any securing annulus or part 7 secured to the lower end of the hub 4, for example by screws 8. The shaft 5 is provided with a preferably axial oil passage 5c which extends upwardly well into the upper portion 5b of the shaft and has one or more, preferably one, radial oil delivery passage 5d, the operation and purpose of which will later appear. It will be understood that oil may be delivered from any suitable source of pressure, for example by the oil supply pipe 9, and used oil may be returned for example by the oil return pipe 9a.

The circumferential frame member 1 is shown as having an outwardly extending upper flange 10, which receives a circumferential abutment ring 11 having a downwardly extending circumferential outside flange 11a and an upwardly extending inner flange 11b. Suitably seated on the flange 11b and normally held in fixed position in relation thereto is the bowl ring 12 in which the bowl 12a is adjustably mounted. Any suitable wearing part or bowl liner 13 is secured to the bowl 12a, as for example by the securing ring 13a and its cooperating outside member 13b. The bowl supporting ring 12 and thus the entire bowl structure are normally held fixed in relation to the circumferential main frame 1, but preferably some yielding release means is provided. Although the release means do not of themselves form part of the present invention, it will be noted that I illustrate a pneumatic system, one element of which appears at the right side of Figure 1. It may, for example, include a cylinder 14, secured to the lower surface of the flange 10, and a piston 15 suitably secured to the ring 12 by means not herein described or shown.

Surrounding the exterior of the cylindrical portion 5b of the fixed shaft 5, I illustrate an eccentrically apertured sleeve 16. This sleeve has a cylindrical inner bore 16a and a cylindrical outer bearing surface 16b. These two bearing surfaces are in eccentric relationship and are described about upwardly converging axes, which meet for example at the point X in Figure 1. Any suitable bearing liners 16c and 16d may be employed. In order to rotate the sleeve 16, I provide the bevel gear 17, keyed or otherwise secured to the lower end of the sleeve. It is shown as in mesh with the bevel pinion 18 on the shaft 19, which may be rotated by any suitable drive connection not herein shown. It will be understood that when the shaft 19 is rotated, it rotates the eccentric sleeve 16. Surrounding the exterior bearing surface 16b of the eccentric sleeve 16 is the head structure generally indicated at 20. It includes the head portion or umbrella 21 and a downwardly extending sleeve portion 22 which surrounds the eccentric 16. Thus, when the eccentric or sleeve 16 is rotated, the result is to impart to the head 20 a gyratory movement about the center X. As a result, the wearing member or mantle 23 is moved toward and away from the bowl liner 13 with a zone of approach which travels rapidly circumferentially about the cavity defined by the two wearing parts. The mantle 23 may be kept in place for example by a thrust cone or sleeve 24 and a threaded locking ring 25, with its upwardly extending sealing ring 25a, which will later be described. Any suitable intermediate thrust member 25b may also be employed. The head 20 may be mounted for example by resting it upon the spherical supporting ring 26, which forms part of or is secured to the main frame, carrying the spherical surface wearing ring 26a, which abuts and supports a correspondingly formed surface 21a on the head. 27 indicates a part of a fluid sealing assembly, the details of which do not form part of the present invention and will therefore not be further described.

In the form of the device herein shown, I find it advantageous to support upon the head a feed delivery assembly which is rotated at a relatively high rate of speed, but nonetheless at a rate substantially lower than the rate of rotation of the sleeve or eccentric 16. I support and drive it as follows: Secured to and upwardly extending from the top of the eccentric or sleeve 16 is a generally conic tubular member 30. Its bottom flange 31 overlies and is secured to the top of the eccentric sleeve 16, for example by screws 31a. It is centered by the inner downwardly extending flange 31b. Its inner surface 31c is roughly conic, defining an oil passage A which decreases progressively from its lower to its upper end.

Secured to the upper end of the member 30 and resting on and centered by the circumferential flange 30a is a disc 32, with its depending portion 32a which centers within the flange 30a. The disc 32 is provided with a central aperture 30b, shown as upwardly reduced or tapered. Slidably positioned upon the upper surface of the disc 32 is a second disc 33. The disc 32 is slotted as at 32b and the second or upper disc 33 is provided a conforming flange or rib 33a. The disc 33 is provided with an axial aperture 33b. Slidable upon the disc 33 is a third or top disc 34. It has an upwardly extending slot 34a, into which extends a conforming flange or a corresponding rib 33c in the intermediate disc 33. The top disc has also an upwardly extending stem 34d and an axial aperture 34e, which communicates with the axial aperture 33b and with the aperture 30b. It will thus be clear that the apertures and their respective discs form a continuous passage which extends from the already described passage A to and through the upper end of the stem 34d. In effect, the discs 32, 33 and 34 are splined together by spline and channel connections which are at right angles to each other. The discs are kept together by the overlying plate 35 with its downward extension 36, through which pass any suitable screws 37, which extend through the bottom disc 32, which is of greater diameter than 33 and 34, and which also seats in the flange 30a of the member 30. All of the opposed surfaces of the previously described members 32, 33 and 34 have oil passages generally indicated at 40 in Figures 3, 4 and 5.

I shall now describe the feed structure proper. 45 indicates a housing having a circumferential outer wall 45a and a bottom wall 45b. Downwardly extending from this bottom wall is a sealing flange 45c, which is in sealing relationship with the upwardly extending flange 25a of the mantle locking ring or nut 25. An inner flange 45d serves to center or position the member 45 upon the head 20. The upwardly extending flange 20x of the head 20 is surrounded and engaged by the flange 45d, and other parts of the bottom wall 45b abut its upper surface. Any suitable locking members or screws 46 may be employed for holding the member 45 normally fixed to the flange 20x of the head 20. Incidentally, the outer surface of the flange 20x is screw-threaded to receive a mantle securing nut or ring 25. Rotatable within the housing 45 is a pinion 47 having a hollow stem 47a which is splined to the stem 34d of the disc 34. It will be understood that in applying or removing the feed assembly, the sleeve 47a is freely slidable in relation to the stem 34d. The sleeve 47a is mounted for rotation in the bottom wall 45b of the member 45 by any suitable roller bearing assembly 49, which is secured to the stem for example by the locking ring 49a. The pinion 47 is in mesh with the gear 50 which rotates in unison with the pinion 51 in mesh with the upper gear 52. The pinions 50 and 51 are mounted on a single stem 50a which projects upwardly from the bottom wall 45b. Any suitable roller bearings 50b may be employed.

The gear 52 is secured to the depending stem 52a of the actuating plate or connection 57. Suitable tapered roller bearing assemblies 52b and 52c receive the depending stem 52a. It will be observed that the gear 52 and its stem 52a have an axial oil delivery duct 52d. The space in which the below-described gears and pinions are housed is upwardly closed by the cover plate 55 in which the actuating plate 57 is rotatably mounted through the medium of the stem 52a. The cover plate may be secured to the member 45 by any suitable screws 55a which enter an internal flange or flanges 45x.

Positioned upon the upper portion of the housing 45 is a rotary feed structure which includes the feed plate 56. The plate 56 has a circumferential downward sealing flange 56a, which surrounds and is in sealed relationship with an upwardly extending flange 45e of the member 45. The plate 56 is rotated by the actuating plate or connection 57 secured to it for example by screws 57a, and itself secured to or forming part of the stem 52a, for rotation with the gear 52. It will thus be clear that as the eccentric 16 rotates, it rotates the top disc 32 and, through the universal connection formed by the members 32, 33 and 34, it also rotates the stem 34d. As the stem 45d is in splined relation to the pinion 47, the top of the feed plate 56 is driven through the below-described gearing at a predetermined and reduced rate, as long as the eccentric sleeve 16 is rotated. Any suitable top feeding member 60 may be employed and it may for example have a side discharge aperture 61, such as is shown in Figure 1.

In maintaining the lubrication of the above-described structure, I prefer to employ oil under a pressure of the order of 50 lbs. per square inch. Referring first to Figure 1, the oil is delivered upwardly through the passage 5c and radially outwardly through the passage 5d to the circumferential passage 5x. It may then rise through the passage 16x in the inner surface of the eccentric sleeve 16. It passes thence through the radial passage 16y to the circumferential passage 16z about the exterior bearing surface of the sleeve 16. It will be understood that from the circumferential passages oil flows both upwardly and downwardly between the eccentric sleeve and the fixed shaft portion 5b and between the outside of the eccentric sleeve and the inner bearing surface of the head portion of the sleeve 22. The oil which flows downwardly enters radial grooves in the upper thrust bearing 16f fastened to the bottom of the eccentric sleeve 16 and thus provides lubrication for the thrust bearing 4x which supports it. The oil which escapes upwardly from the top of the inner eccentric bearing surface, as indicated by the arrows in Figures 1 and 2, above the top of the shaft portion 5b, flows upwardly, thus providing lubrication of the above-described universal joint on the top of the eccentric and the bearings and gears in the gear housing 45. The oil being under pressure fills the passage A and flows through the communicating axial passages 30b, 33b, 34e, 52d, etc., to the top of the plate 57. It thence flows down to lubricate the roller bearings 52b and 52c. I illustrate for example in Figure 2 a sealing labyrinth between the plates 55 and 57, the oil from which is downwardly discharged through passages 55x.

The oil which escapes from the top of the outer eccentric bearing and the oil from the gear housing fills the cavity above the outer eccentric bushing or liner 16d, as shown at 16g in Figure 2. This oil then escapes by gravity through the diagonal downward discharge duct 21x and provides lubrication to the large spherical bearing formed by the opposed members 21a and 26a. Any excess oil above the eccentric bushing flows through suitable diagonal discharge passages 22x in the flange 22 and is returned to the interior of the crusher and, eventually, to the oil tank by the passage 9a. Thus the delivery of oil under pressure and in suitable volume upwardly through the oil passage 5c maintains adequate lubrication of the inner eccentric sleeve bearing with the fixed shaft, the outer eccentric sleeve bearing with the head, and also supplies oil to the main spherical bearing and to the bearings for the shaft 19. Likewise, through the passage A, oil is delivered under pressure to the universal connection between the eccentric sleeve and the feed drive and to all moving parts in the feed drive proper.

In Figures 7 and 8 I illustrate an alternate form of my device, wherein oil is delivered under pressure to the universal connection between the eccentric sleeve and the feed drive and to all moving parts in the feed drive proper through a separate conduit rather than through the passage A. Referring specifically to Figure 7, a radial hole 100 conveys the oil from the annular groove or circumferential passage 5x in the main shaft 5 through the hole 101 in the eccentric bushing or sleeve 16c. The oil is thereafter conveyed upwardly through the vertical passage 102 and oil pipe or tube means 103 to the antifriction bearings and gears located in the gear housing. The oil pipe 103 may be formed at right angles as at 103a and 103b so as to pass horizontally through an opening 104 in the walls forming the space A and so that the pipe or tube 103 may thereafter extend upwardly into a vertical passage 105 formed in the upper wall of the member 130, which member 130 corresponds to the member 30 illustrated in Figures 1 and 2, with the exception that the member 130 carries an upper horizontal wall through which the passage 105 extends. The pipe 103 may be secured at its upper end to the member 130 in vertical alignment with the passage 105 as by the threaded engagement generally illustrated at 106. It will be understood that the structure above the passage 105 is substantially identical with the structure illustrated in Figures 1 and 2. The oil which passes upwardly through the passage A into the passage 30b as illustrated in Figures 1 and 2 now passes upwardly through the pipe 103 and the passage 105 into the passage or aperture 30b.

A rapid escape means for the hot oil from the upper portion of the sleeve 16 is illustrated in Figures 7 and 8. A series of holes similar to that illustrated at 110 is arranged around the upper perimeter of the eccentric 16. The holes 110 lead through generally radial passages 111 which in turn lead outwardly, as at 112, from the eccentric 16 to the cavity above the outer eccentric bushing or liner 16b, as shown at 16g in Figure 2.

It will be realized that whereas I have described and claimed a practical and operative device, nevertheless many changes may be made in size, shape, number and disposition of parts without departing from the spirit and scope of my invention. I therefore wish my description and drawings to be taken as in a broad sense illustrative or diagrammatic rather than as limiting me to my specific showing herein. It will be realized, for example, that whereas I have illustrated my invention as applied to a device which is in a broad sense a fine reduction machine, I do not wish to limit the application of my invention to this particular machine, or to fine reduction machines in general. It may be applied to any structure in which a head is gyrated and a feed member is mounted on and rotated in relation to a head.

The use and operation of my invention are as follows:

I provide a simple and efficient lubrication system for use in crushers and the like which permits the flow of a large volume of oil through the bearings at a high pressure. I also provide an efficient driving connection for the feed plate of a gyratory crusher for use in crushers in which it is desired to rotate a feed plate in conjunction with the gyration of a crushing head and means to provide lubrication for the driving connection and associated gears and bearings.

With my system, the oil film in the eccentric bearings may be maintained at a constant pressure of as high as fifty (50) pounds per square inch, if desired, throughout the full length of the bearings. This is often important in crushers, because the unit pressures in the eccentric bearings are usually very high.

The preferred method of forcing the oil through the bearings is by the employment of an independently motor-driven pump. The oil pump can be mounted on the crusher countershaft housing and in geared connection with the countershaft. With such an arrangement, the oil will immediately be forced through the bearings when the eccentric is rotated.

However, with a separate motor-driven oil pump, an electrical interlock with the main crusher switch can advantageously be installed to provide a flow of oil at a predetermined pressure through the bearings, before the crusher is started in operation and, furthermore, to provide safety in the event failure occurs with the oil pump, or for any reason the oil pressure drops below the minimum established oil pressure.

As previously pointed out, the oil under high pressure is forced upwardly through the coil duct 5c in the fixed shaft 5. The oil is conveyed to the inner and outer eccentric bearings through the annular grooves in the main shaft and eccentric and flows upward and downwardly under high pressure in the direction of the arrows.

The oil which escapes from the top of the inner eccentric bearing travels upwardly to lubricate the universal driving connection located on top of the eccentric and the gears and bearings in the gear housing mounted on the head. The large spherical bearing which supports the head is lubricated by gravity feed through the diagonal hole 21x, because the velocity and unit pressure of this bearing are relatively low.

In the alternative form illustrated in Figures 7 and 8, the oil under high pressure is forced upwardly through the oil duct 5c in the fixed shaft 5, as in the structures illustrated in Figures 1 and 2. Thereafter the oil passes to the annular groove 5x in the shaft 5 and through a hole 101 in the sleeve bearing 16c and thereafter to the passage 100—102 which extends radially and then upwardly through the eccentrically apertured sleeve 16, to the pipe 103 which is secured to the hollow torque member 130 as at 106. Thus oil for the gears may be carried separately upward to the gears. The final discharge of the oil from inside the head is through the holes 22x as is the case with the structures illustrated in Figures 1 and 2. The structure illustrated in Figures 7 and 8 is effective to provide a separate oil duct for the antifriction bearings and gears located within the gear housing and at the same time to provide for a rapid escape of the oil from the upper portion of the eccentric bearing through the holes 110 and the passage 111.

I claim:

1. In a gyratory crusher or grinder having a gyratable head, means for gyrating the head, including an eccentrically apertured sleeve and means for rotating it, a feed assembly mounted on the head including a feed member and a chain of gears between the feed member and the eccentrically apertured sleeve, and means for lubricating said gears, including lubricant-conveying means rotatable with said sleeve and adapted to convey fresh lubricant under pressure upwardly to said gears from a point substantially below the top of said apertured sleeve before said lubricant has performed a lubricating function.

2. The structure of claim 1 wherein said lubricant conveying means includes a passage in said apertured sleeve adapted to receive lubricant from an area within said sleeve and to convey said lubricant upwardly and pipe means connected to said passage for rotation with said sleeve and adapted to convey lubricant upwardly to said gears from the upper limit of said passage.

3. In a gyratory crusher, a normally fixed frame, a head and means for gyrating it within the frame, a bowl normally fixed on the frame, opposed members on bowl and head, defining between them a crushing cavity, means for feeding material to be crushed in the cavity, including a feed member mounted on said head and rotated in relation to it, the means for gyrating the head including a fixed shaft and an eccentrically apertured sleeve surrounding said shaft and means for gyrating it, and a bearing connection between the exterior of the sleeve and the head, the means for driving the feed member including a housing mounted on the head, a feed plate rotatably mounted on the housing and a driving connection from the eccentric to the feed member including a chain of gears and unitary means for lubricating said chain of gears, said means including an annular groove in said shaft, and means for supplying oil to said groove under pressure, a passage means in said sleeve adapted to receive oil from said groove, and pipe means connected to said passage and adapted to convey oil upwardly from said passage to said gears, said pipe means being fixed for rotation with said sleeve.

4. In a gyratory crusher having a gyratable head and a rotary feed member mounted on said head, means for gyrating the head including an eccentrically apertured sleeve, means for rotating the sleeve, a feed assembly mounted on the head, including a housing normally held against movement in relation to the eccentric, a feed plate mounted upon and closing the top of said housing, and a driving connection between the eccentric and the feed plate including a chain of gears within said housing and a slip plate connection between the eccentric and the chain of gears including a series of plates, plates of said series having a plurality of rib and slot connections, one of said rib and slot connections being at right angles to another of said rib and slot connections.

5. In a gyratory crusher having a gyratable head, means for gyrating the head, including an eccentrically apertured sleeve and means for rotating the sleeve, a feed assembly mounted on the head including a feed member and a chain of gears between the feed member and the eccentrically apertured sleeve, some of the gears of said chain being secured to and rotatable with shafts substantially in axial alignment with said sleeve and means for lubricating said gears, including a hollow torque member secured to the upper end of said sleeve for rotation therewith, said torque member having a central passage, the diameter of which is progressively and continuously reduced toward its upper end, the upper end of said torque member being connected to said gear chain to rotate said gears, an oil passage extending through said aligned shafts and positioned to receive oil under pressure from said central passage and to conduct said oil upwardly to a point above said gear chain, and to deliver oil for gravity flow downwardly through said gear chain, said gear chain being positioned to receive oil from said point above said gear chain, said feed assembly including a housing enclosing said gear chain and passages in said housing and said head positioned to receive oil from said gear chain and to direct said oil to a point about the outer surface of the upper end of said sleeve.

6. The structure of claim 5 wherein said head is mounted for gyration upon a spherical bearing and characterized by and including a downwardly directed passage in said head, said last named passage being positioned to receive oil from said space about the upper end of said sleeve and to conduct oil by gravity to the bearing surfaces of said head and said spherical bearing.

7. The structure of claim 6 characterized by and including a second passage in said head in communication with said space about the upper end of said sleeve at a point above the point at which said first head passage is in communication with said space, said second passage being positioned to convey over-flow oil downwardly by gravity from said space.

8. In a gyratory crusher, a gyratable head, means for gyrating the head including a fixed shaft, an eccentrically apertured sleeve surrounding said shaft and means for rotating said sleeve, a feed assembly mounted on the head including a feed member, a housing and a chain of gears in said housing between the feed member and the eccentrically apertured sleeve, and means for lubricating said gears, including a central passage in said shaft, means for feeding lubricant under pressure through said passage, an annular groove in the outer surface of said shaft intermediate its upper and lower ends, said groove being in communication with said passage to receive lubricant under pressure therefrom, a vertically extending passage in said eccentric sleeve and positioned to receive lubricant under pressure from said groove and to conduct lubricant upwardly through said sleeve, a pipe connected to the upper end of said passage to receive lubricant under pressure therefrom and extending upwardly above said sleeve, said pipe being connected to said sleeve for rotation therewith, a lubricant passage extending through said chain of gears, the upper end of said pipe being in communication with the lower end of said last named lubricant passage, said lubricant passage through said chain of gears extending to and positioned to conduct lubricant to a point above said gears, and downwardly directed passage means in said housing positioned to conduct lubricant by gravity downwardly to said chain of gears from said last named point.

9. The structure of claim 8 wherein said sleeve extends above the upper end of said shaft and characterized by and including radially extending apertures in said sleeve above said shaft and positioned to convey lubricant from a point above said shaft within said sleeve to a point about the outer surface of the upper end of said sleeve, an inner surface of said head cooperating with said outer surface of the upper end of said sleeve to define a lubricant-receiving space.

10. The structure of claim 9 wherein said head is mounted for gyration upon a spherical bearing and characterized by and including downwardly directed passage means in said head in communication with a lower portion of said lubricant-receiving space and positioned to conduct lubricant under gravity from said space to said spherical bearing.

References Cited in the file of this patent

UNITED STATES PATENTS

| | | |
|---|---|---|
| 2,158,779 | Rumpel | May 16, 1939 |
| 2,335,170 | Cerisano | Nov. 23, 1943 |
| 2,509,920 | Gruender | May 30, 1950 |
| 2,621,860 | Gruender | Dec. 16, 1952 |
| 2,713,461 | Kjelgaard | July 19, 1955 |